United States Patent
Van Den Berghe et al.

(10) Patent No.: US 9,472,310 B2
(45) Date of Patent: Oct. 18, 2016

(54) COATED NUCLEAR REACTOR FUEL PARTICLES

(75) Inventors: Sven Van Den Berghe, Verrebroek (BE); Ann Leenaers, Zolder (BE); Christophe Detavernier, Denderleeuw (BE)

(73) Assignees: SCK.-CEN, Brussels (BE); UNIVERSITEIT GENT, Ghent (BE)

( * ) Notice: Subject to any disclaimer, the term of this patent is extended or adjusted under 35 U.S.C. 154(b) by 157 days.

(21) Appl. No.: 13/504,212

(22) PCT Filed: Oct. 29, 2010

(86) PCT No.: PCT/EP2010/066469
§ 371 (c)(1),
(2), (4) Date: Apr. 26, 2012

(87) PCT Pub. No.: WO2011/051447
PCT Pub. Date: May 5, 2011

(65) Prior Publication Data
US 2012/0207264 A1    Aug. 16, 2012

(30) Foreign Application Priority Data
Oct. 30, 2009 (GB) .................................. 0919067.9

(51) Int. Cl.
*G21C 3/00* (2006.01)
*G21C 3/60* (2006.01)
*G21C 3/62* (2006.01)

(52) U.S. Cl.
CPC ................. *G21C 3/60* (2013.01); *G21C 3/626* (2013.01); *Y02E 30/38* (2013.01)

(58) Field of Classification Search
CPC ...................................................... G21C 21/02
USPC .................. 376/409, 411, 412, 421, 422
See application file for complete search history.

(56) References Cited

U.S. PATENT DOCUMENTS

| 3,429,295 A | 2/1969 | Shapiro |
| 3,567,581 A * | 3/1971 | Feraday ............... G21C 3/60 |
| | | 148/401 |
| 4,978,480 A * | 12/1990 | Stansfield et al. ........ 264/0.5 |

(Continued)

FOREIGN PATENT DOCUMENTS

| EP | 0376583 A1 | 7/1990 |
| GB | 1068815 | 5/1967 |

OTHER PUBLICATIONS

International Search Report for PCT/EP2010/066469, Apr. 4, 2011.
(Continued)

*Primary Examiner* — Jack W Keith
*Assistant Examiner* — Sharon M Davis
(74) *Attorney, Agent, or Firm* — Bacon & Thomas, PLLC

(57) ABSTRACT

A method is described for producing nuclear fuel products, including the steps of receiving metallic or intermetallic uranium-based fuel particle cores, providing at least one physical vapour deposited coating layer surrounding the fuel particle core and embedding the nuclear fuel particles in a matrix so as to form a powder mixture of matrix material and coated fuel particles. The at least one physical vapour deposited coating layer may include inhibitors of inhibiting, stabilizing and/or reducing interaction between metallic and intermetallic uranium-based fuel particles cores and the matrix wherein the fuel particles typically may be embedded. The deposited coating layer may include neutron poisons.

22 Claims, 1 Drawing Sheet

(56) References Cited

U.S. PATENT DOCUMENTS

| | | | |
|---|---|---|---|
| 5,377,246 A * | 12/1994 | Taylor et al. | 376/416 |
| 2007/0284108 A1* | 12/2007 | Roes et al. | 166/302 |
| 2008/0240334 A1* | 10/2008 | Senor et al. | 376/416 |
| 2009/0129533 A1* | 5/2009 | Kuczynski | 376/411 |
| 2011/0286570 A1* | 11/2011 | Farmer et al. | 376/416 |

OTHER PUBLICATIONS

Pasqualini, E., "Dispersed (Coated Particles) and Monolithic (Zircalloy-4 Cladding) U-Mo Miniplates", RERTR 2005 Meeting, Buenos Aires, Argentina.

Franck, N. et al., "CD Wires as Burnable Poison for the BR2 Fuel Element", Transactions of RRFM 2009.

Australian Office Action dated Feb. 14, 2014, for AU 2010311373.

Chilean Office Action dated Aug. 25, 2015, for CL 1104-2012.

Yang et al., "Imaging and measuring methods for coating layer thickness of TRISO-coated fuel particles with high accuracy", NDT & E International, Apr. 2013.

Hollis, "Zirconium Diffusion Barrier Coatings for Uranium Fuel used in Nuclear Reactors", Advanced Materials & Processes, Nov.-Dec. 2010.

Gelbard, "Analytical Modeling of Fission Product Releases by Diffusion from Multicoated Fuel Particles", Sandia Report, SAND2002-3966, Unlimited Release, Sandia National Laboratories, Printed Mar. 2003.

Korean Office Action dated Jun. 28, 2016, for KR 10-2012-7013950, and English translation thereof.

* cited by examiner

COATED NUCLEAR REACTOR FUEL PARTICLES

FIELD OF THE INVENTION

The invention relates to the field of nuclear reactor fuels. More particularly, the present invention relates to methods for making nuclear reactor fuel particles, as well as to the nuclear reactor fuel components and particles thus obtained and their use.

BACKGROUND OF THE INVENTION

In the search for a suitable fuel to replace the high enriched $UAl_x$ fuel generally used in Research and Materials Test Reactors (MTR) with a lower enrichment fuel, one viable candidate is found to be a U—Mo alloy. Mo is added to metallic uranium to extend the stability domain of the high temperature gamma phase, since this phase is stable under the required irradiation conditions in contrast to the room temperature alpha phase. 7-10 wt % Mo is sufficient to avoid transformation to the alpha phase during the production process. U(Mo) particles are used in the fabrication of so-called dispersion fuel plates or rods, in which the U(Mo) particles are mixed with a matrix material (generally Al). In case of a fuel plate, the compacted powder mixture is subsequently pressed in between two Al alloy plates, after which this sandwich structure is rolled to the required thickness. In case of fuel rods, fabrication may often be based on coextrusion methods.

A common method to manufacture the U(Mo) particles is by atomisation processes, which can best be described as a technique in which an ingot of U(Mo) alloy is molten using arc melting while it is spinning or a variation thereof. This causes molten material to be dispersed in small droplets by the centripetal forces. The droplets solidify on their way to the cooled chamber walls. The resulting spherical particles are very well suitable for the fabrication of the dispersion fuel plates or rods. Their sizes depend on the parameters used in the melting process, but are generally around 100 µm in diameter. Another production process based on grinding of ingots results in more or less irregular ground particles of similar average dimensions. Both production processes have been used in the production of test fuel plates.

Tests of U(Mo) based fuels in the reactor have revealed that the U(Mo) particles (atomised and ground) form an interaction layer with the Al matrix under irradiation. This interaction layer was demonstrated to amorphise under irradiation and shows very poor fission gas retention. This causes swelling of the fuel plates, which eventually leads to their failure by pillowing. In an attempt to remedy this behaviour, it was found that Si addition to the Al matrix results in some improvement, although it may not provide a complete solution, particularly for higher power densities. In "Dispersed (Coated particles) and monolithic (zircalloy-4 cladding) U—Mo Particles" (RERTR—2005 Meeting), Pasqualini describes CVD coating of U(Mo) particles with a silicon coating for introducing silicon as an inhibitor. Chemical vapour deposition of silicon thereby is based on silane. Furthermore, silicon is undesireable for the reprocessing of the used fuel and an alternative way, without Si, to stabilise the behaviour of the U(Mo) fuel during irradiation would be beneficial.

The incorporation of neutron poisons in nuclear fuels is a frequently used method to fine-tune the characteristics of the fuel towards its use in the reactor. Neutron poisons typically may have the purpose of lowering the reactivity at the beginning of the use of a fuel assembly in the reactor. Incorporation of neutron poisons is preferably homogeneous throughout the fuel and is often accomplished by blending neutron poison powders in the matrix. Because of several reasons, eg. the higher uranium loadings required in the LEU based fuels, this blending method is less appropriate for LEU based fuels and efforts are made to incorporate the neutron poison in the structural materials of the fuel element. In "Cd wires as burnable poison for the BR2 fuel element" by Franck et al. in Transactions of RRFM 2009, it is suggested to replace the provision of neutron poisons as powder mixed in the matrix by the provision of wires of neutron poison material in the structural materials of the fuel element.

SUMMARY OF THE INVENTION

It is an object of embodiments of the present invention to provide good methods for manufacturing nuclear fuel products as well as to provide good nuclear fuel products thus obtained and good use thereof. It is an advantage of embodiments according to the present invention that a flexible deposition technique for coating a variety of materials onto fuel particles for making nuclear fuel products is obtained.

It is an advantage of embodiments according to the present invention that a homogeneous application of functional material can be provided to nuclear fuel particles in an efficient way, with no or only a limited influence on the nuclear fuel particle itself or the corresponding nuclear fuel product. It is an advantage of embodiments according to the present invention that deposition of functional materials can be performed at substantially low temperature, i.e. below 500° C., advantageously below 300° C., more advantageously substantially at room temperature. The latter allows providing functional material in a homogeneous manner, without hampering the properties of the nuclear fuel particle or the corresponding nuclear fuel product itself. It is an advantage of embodiments according to the present invention that the unwanted oxidation or hydriding of the fuel particles during the deposition of the functional materials can substantially be limited.

It is an advantage of embodiments according to the present invention that fully tailoring the particles and thus the fuel products to the fuel needs of the reactor can be performed due to the high flexibility of the adopted coating method allowing a wide range of coating materials and thicknesses to be applied.

It is an advantage of embodiments according to the present invention that coating of the fuel particles with a neutron poison can be performed, resulting in a fully homogeneously dispersion of neutron poisons in the fuel.

It is an advantage of embodiments according to the present invention that the coating process can be easily controlled and up-scaled.

It is an advantage of embodiments according to the present invention that the addition of foreign elements to the fuel (e.g. addition of Si to the Al matrix) can be optimised and minimised for each specific application (e.g. desired power output of the fuel).

It is an advantage of embodiments according to the present invention that different types of coatings can be deposited on fuel particles, each with possible different functionalities, resulting in the possibility to optimise the fuel products.

It is an advantage of some embodiments according to the present invention that both neutron poisons as well as inhibitors can be added in an efficient way, e.g. simultaneously or subsequently using the same system.

It is an advantage of some embodiments according to the present invention that different types of elements can be co-deposited onto fuel particles so that different additional functionalities can simultaneously be provided to the fuel particles, resulting in an optimisation of the fuel products.

It is an advantage of some embodiments according to the present invention that a combination of different coating layers of different elements can be applied to the fuel particles. Alternatively or in addition thereto, different elements having different functionality also can be applied in a single coating layer.

The above objective is accomplished by a method and device according to the present invention.

The present invention relates to a method for producing nuclear fuel products including fuel particles, the method comprising receiving metallic or intermetallic uranium-based fuel particle cores, providing at least one physical vapour deposited coating layer surrounding the fuel particle core and embedding the coated fuel particles in matrix material thereby forming a powder mixture of coated fuel particles and matrix material. It is an advantage of embodiments according to the present invention that physical vapour deposition is a flexible coating technique.

Embedding the coated fuel particles in matrix material may comprise creating a powder dispersion, e.g. homogeneous powder dispersion, of the coated fuel particles in a solid matrix powder.

Providing at least one physical vapour deposited coating layer may comprise sputtering a coating layer on the fuel particle core. The method furthermore may comprise annealing the provided coating layer. The annealing may be thermal annealing. Providing at least one physical vapour deposited coating layer comprises depositing a physical vapour deposited coating layer having a thickness between 10 nm and 2 µm, e.g. between 100 nm and 2 µm. The method may comprise compacting the mixture of coated fuel particles and matrix material.

The method may comprise rolling the compacted mixture of coated fuel particles and matrix material between plates, so as to form a fuel element.

The method may comprise extruding a fuel element from a mixture of coated fuel particles and matrix material.

Providing at least one physical vapour deposited coating layer may comprise providing at least one physical vapour deposited coating layer comprising neutron poisons.

Providing at least one physical vapour deposited coating layer may comprise providing at least one physical vapour deposited coating layer comprising inhibitor elements for inhibiting formation of an interaction layer of the nuclear fuel particle with the matrix material.

Providing the at least one physical vapour deposited coating layer may comprise providing a single coating layer comprising both neutron poisons and inhibitor elements using co-deposition.

Providing the at least one physical vapour deposited coating layer may comprise providing a plurality of coating layers, each layer comprising one or more elements for introducing an additional functionality to the fuel particles.

The method according to embodiments of the present invention thus comprises embedding the coated fuel particles in a matrix. The matrix may be any of aluminium, silicon, magnesium, zirconium, molybdenum or a mixture or alloy thereof.

The present invention also relates to a nuclear fuel product, e.g. embedded nuclear fuel particles, the nuclear fuel product comprising a powder mixture of the nuclear fuel particles and matrix material based on nuclear fuel particles embedded in the matrix material, the nuclear fuel particles comprising a metallic or intermetallic uranium-based fuel particle core and at least one physical vapour deposited coating layer surrounding the fuel particle core. It is an advantage of embodiments according to the present invention that the coating can be applied using a flexible technique, allowing surface engineering and tailoring of coatings for fuel particles and allowing new and/or improved functionality implemented on the fuel particles. A matrix material and nuclear fuel particles embedded therein may comprise a powder dispersion, e.g. homogeneous powder dispersion, of the coated fuel particles in a solid matrix powder. The at least one physical vapour deposited coating layer may be an amorphous coating layer. The at least one physical vapour deposited coating layer may have a thickness between 10 nm and 2 µm, e.g. between 100 nm and 2 µm. The matrix may be any of aluminium, silicon, magnesium, zirconium, molybdenum or a mixture thereof. The mixture of the matrix material and the fuel particles may be compacted e.g. by pressing.

The at least one physical vapour deposited coating layer may comprise neutron poisons. It is an advantage of embodiments according to the present invention that neutron poisons can be applied as coating for fuel particles in a fuel product, resulting in a homogeneous provision of neutron poisons in nuclear fuel leading to an efficient functionality of the neutron poisons. It is an advantage of embodiments according to the present invention that the thickness of the coating can be tailored to have optimum effect of neutron poisons. The neutron poisons may comprise one of or a combination of B, Sm, Gd, Dy, Ag, In, Cd, Er, Hf, Eu or Ta. It is an advantage of embodiments according to the present invention that the physical vapour deposition coating allows a large flexibility in deposition of neutron poisons to be selected, allowing good tailoring for a large category of fuel particle cores and reactors. The at least one physical vapour deposited coating layer may comprise inhibitor elements for inhibiting formation of an interaction layer of the nuclear fuel particle with the matrix material and/or inhibiting the negative effects of this interaction layer formation on the behaviour of the fuel during its use.

It is an advantage of embodiments according to the present invention that a coating layer of a inhibitor element can be applied to the metallic or intermetallic uranium-based particles, resulting in a homogeneous distribution of such inhibitor elements and therefore resulting in efficient inhibition of the interaction process between nuclear fuel particles and the matrix material. Inhibiting may be reducing the formation of an interaction layer as well as preventing the formation of an interaction layer or improving its properties (i.e. avoiding the detrimental effects caused by the interaction layer). The inhibitor elements may comprise one of or a combination of Si, Zr, Nb, U, Mo, Al, Ti, As, Mg, Ge, Sn, Pb, Bi, Se, Sb or Te. The inhibitor may comprise any or a combination of Group IIIa, IVa, Va and VIa elements, on rows 3, 4, 5 and 6 of the table of elements, excluding Po, P and S. The inhibitor elements may be provided as an oxide, nitride or carbide of such inhibitor elements. In some embodiments, they may be provided through direct deposition of the oxide, nitride or carbide or through reactive deposition of the elements. In some embodiments, inhibitor elements, e.g. including other inhibitor elements than cited above, either in their elemental state or as an oxide, nitride or carbide may be used, the inhibitor elements being adapted for providing a barrier between the atoms of the metallic or intermetallic uranium based fuel and the atoms of the matrix material as these become mobile, either due to temperature, ionic bombardment by fission products of the uranium or another source of mobility. For this purpose, heavier, denser compounds are advantageous.

The at least one physical vapour deposited coating layer may comprise a single coating layer comprising both neutron poisons and inhibitor elements obtained by co-deposition. It is an advantage of embodiments according to the present invention that physical vapour deposition provides the flexibility of co-depositing, resulting in the possibility of obtaining an efficient coating process providing multiple additional functionalities to the fuel product.

The at least one physical vapour deposited coating layer may comprise a stack of at least two layers, one layer comprising neutron poisons, another layer comprising inhibitor elements. It is an advantage of embodiments according to the present invention that the different additional functionalities for the nuclear fuel particles may be provided in different coating layers, whereby each of the layers can be tuned for optimum functionality. The at least one physical vapour deposited coating layer may be an annealed coating layer.

It is an advantage of embodiments according to the present invention that thick layers can be deposited allowing full functionality and the required efficiency of the elements embedded therein. The thickness of the at least one physical vapour deposited coating layer may be in the range 5 nm to 5 μm, advantageously in the range 10 nm to 2 μm, e.g. 100 nm to 2 μm.

The metallic or intermetallic uranium-based core may comprise one or a combination of uranium alloys (eg. pure U, U(Mo), U(Ti), U(Zr), U(Nb)), uranium silicides (eg. $U_3Si_2$, $U_3Si$) or aluminides (eg. $UAl_{3-x}$). It is an advantage of embodiments according to the present invention that different types of fuel particle cores can be selected, resulting in a good flexibility.

The present invention furthermore relates to a nuclear fuel product, the fuel product comprising a powder mixture matrix material and fuel particles based on fuel particles embedded in the matrix material, the fuel particles comprising a metallic or intermetallic uranium-based fuel particle core and at least one coating layer surrounding the fuel particle core, the coating layer comprising neutron poisons. The neutron poisons may comprise one of or a combination of B, Sm, Gd, Dy, Ag, In, Cd, Er, Hf, Eu or Ta. A matrix material and fuel particles embedded therein may be a powder dispersion, e.g. homogeneous powder dispersion, of the nuclear fuel particles and the matrix material. The at least one physical vapour deposited coating layer may have a thickness between 10 nm and 2 μm, e.g. between 100 nm and 2 μm. The matrix may be any of aluminium, silicon, magnesium, zirconium, molybdenium or a mixture thereof. The mixture of the matrix material and the fuel particles may be compacted and rolled, e.g. between plates, for forming a fuel element. A fuel element also may be extruded using the mixture of the matrix material and the fuel particles.

The at least one coating layer further may comprise inhibitor elements for inhibiting formation of an interaction layer of the nuclear fuel particle and the matrix material. The inhibitor elements may comprise one of or a combination of Si, Zr, Nb, U, Mo, Al, Ti, As, Mg, Ge, Sn, Pb, Bi, Se, Sb or Te. The inhibitor may comprise any or a combination of Group IIIa, Iva, Va and VIa elements, on rows 3, 4, 5 and 6 of the table of elements, excluding Po, P and S. The inhibitor elements may be provided as an oxide, nitride or carbide of such inhibitor elements. In some embodiments, they may be provided through direct deposition of the oxide, nitride or carbide or through reactive deposition of the elements. In some embodiments, inhibitor elements, e.g. including other inhibitor elements than cited above, either in their elemental state or as an oxide, nitride or carbide may be used, the inhibitor elements being adapted for providing a barrier between the atoms of the metallic or intermetallic uranium based fuel and the atoms of the matrix material as these become mobile, either due to temperature, ionic bombardment by fission products of the uranium or another source of mobility. For this purpose, heavier and/or denser compounds are advantageous.

The at least one coating layer may comprise a single coating layer comprising both neutron poisons and inhibitor elements obtained by co-deposition.

The at least one coating layer may comprise a stack of at least two layers, one layer comprising neutron poisons, another layer comprising inhibitor elements.

The at least one coating layer may be an annealed coating layer.

The thickness of the at least one coating layer may be in the range 10 nm to 2 μm, e.g. between 100 nm and 2 μm.

The metallic or intermetallic uranium-based core may comprise one or a combination of uranium alloys (eg. pure U, U(Mo), U(Ti), U(Zr), U(Nb)), uranium silicides (eg. $U_3Si_2$, $U_3Si$) or aluminides (eg. $UAl_{3-x}$).

The present invention also relates to a fuel element for generating neutrons, the fuel element comprising a plurality of nuclear fuel particles as described above embedded in a matrix material based on a powder mixture of the nuclear fuel particles and matrix material. The matrix may be a matrix comprising Al, Si, Mg, Zr, Mo. It may be a matrix made of Al, Si, Mr, Zr, Mo or a mixture thereof.

The present invention also relates to a nuclear installation for generating neutrons, the nuclear installation comprising a fuel element as described above.

The present invention furthermore relates to a method for producing nuclear fuel particles, the method comprising receiving metallic or intermetallic uranium-based fuel particle cores and providing at least one coating layer surrounding the fuel particle core, wherein the coating layer comprises neutron poisons. The method furthermore comprises providing a powder mixture of fuel particles and matrix material, by embedding the fuel particles in matrix material. It is an advantage of embodiments according to the present invention that physical vapour deposition is a flexible coating technique.

Providing at least one coating layer may comprise physical vapour depositing such a layer, such as for example sputtering such a coating layer on the fuel particle core. The method furthermore may comprise annealing the provided coating layer. The annealing may be thermal annealing.

Providing at least one coating layer may comprise providing at least one coating layer comprising inhibitor elements for inhibiting formation of an interaction layer of the nuclear fuel particle with a matrix in which the nuclear fuel particle is embeddable.

Providing the at least one coating layer may comprise providing a single coating layer comprising both neutron poisons and inhibitor elements using co-deposition.

Providing the at least one coating layer may comprise providing a plurality of coating layers, each layer comprising one or more elements for introducing an additional functionality to the fuel particles.

The present invention furthermore relates to a nuclear fuel product, the fuel product comprising a powder mixture matrix material and fuel particles based on fuel particles embedded in the matrix material, the fuel particles comprising a metallic or intermetallic uranium-based fuel particle core and at least one coating layer surrounding the fuel particle core, the coating layer comprising inhibitor elements. The inhibitor elements may comprise one of or a combination of Si, Zr, Nb, U, Mo, Al, Ti, As, Mg, Ge, Sn, Pb, Bi, Se, Sb or Te. The inhibitor may comprise any or a combination of Group IIIa, Iva, Va and VIa elements, on rows 3, 4, 5 and 6 of the table of elements, excluding Po, P and S. The inhibitor elements may be provided as an oxide, nitride or carbide of such inhibitor elements. In some embodiments, the inhibitor element may comprise Zr or an oxide, nitride or carbide thereof. In some embodiments, the inhibitor element may be ZrN. In some embodiments, they may be provided through direct deposition of the oxide, nitride or carbide or through reactive deposition of the elements. In some embodiments, inhibitor elements, e.g. including other inhibitor elements than cited above, either in their elemental state or as an oxide, nitride or carbide may be used, the inhibitor elements being adapted for providing a barrier between the atoms of the metallic or intermetallic uranium based fuel and the atoms of the matrix material as these become mobile, either due to temperature, ionic bombardment by fission products of the uranium or another source of mobility. For this purpose, heavier and/or denser compounds are advantageous. A matrix material and fuel particles embedded therein may be a powder dispersion, e.g. homogeneous powder dispersion, of the nuclear fuel particles and the matrix material. The at least one physical vapour deposited coating layer may have a thickness between 10 nm and 2 μm. The matrix may be any of aluminium, silicon, magnesium, zirconium, molybdenum or a mixture thereof. The mixture of the matrix material and the fuel particles may be compacted and rolled, e.g. between plates, for forming a fuel element. A fuel element also may be extruded using the mixture of the matrix material and the fuel particles.

The at least one coating layer further may comprise a neutron poison element. The neutron poisons may comprise one of or a combination of B, Sm, Gd, Dy, Ag, In, Cd, Er, Hf, Eu or Ta.

The at least one coating layer may comprise a single coating layer comprising both neutron poisons and inhibitor elements obtained by co-deposition.

The at least one coating layer may comprise a stack of at least two layers, one layer comprising neutron poisons, another layer comprising inhibitor elements.

The at least one coating layer may be an annealed coating layer.

The thickness of the at least one coating layer may be in the range 10 nm to 2 μm.

The metallic or intermetallic uranium-based core may comprise one or a combination of uranium alloys (eg. pure U, U(Mo), U(Ti), U(Zr), U(Nb)), uranium silicides (eg. $U_3Si_2$, $U_3Si$) or aluminides (eg. $UAl_{3-x}$). The product may be a nuclear fuel element or may be processed to a nuclear fuel element. The present invention also relates to a nuclear installation comprising such a product.

The present invention furthermore relates to a method for producing nuclear fuel particles, the method comprising receiving metallic or intermetallic uranium-based fuel particle cores and providing at least one coating layer surrounding the fuel particle core, wherein the coating layer comprises inhibitor elements. The method furthermore comprises providing a powder mixture of fuel particles and matrix material, by embedding the fuel particles in matrix material. It is an advantage of embodiments according to the present invention that physical vapour deposition is a flexible coating technique.

Providing at least one coating layer may comprise physical vapour depositing such a layer, such as for example sputtering such a coating layer on the fuel particle core. The method furthermore may comprise annealing the provided coating layer. The annealing may be thermal annealing.

Providing at least one coating layer may comprise providing at least one coating layer comprising neutron poisons.

Providing the at least one coating layer may comprise providing a single coating layer comprising both neutron poisons and inhibitor elements using co-deposition.

Providing the at least one coating layer may comprise providing a plurality of coating layers, each layer comprising one or more elements for introducing an additional functionality to the fuel particles.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
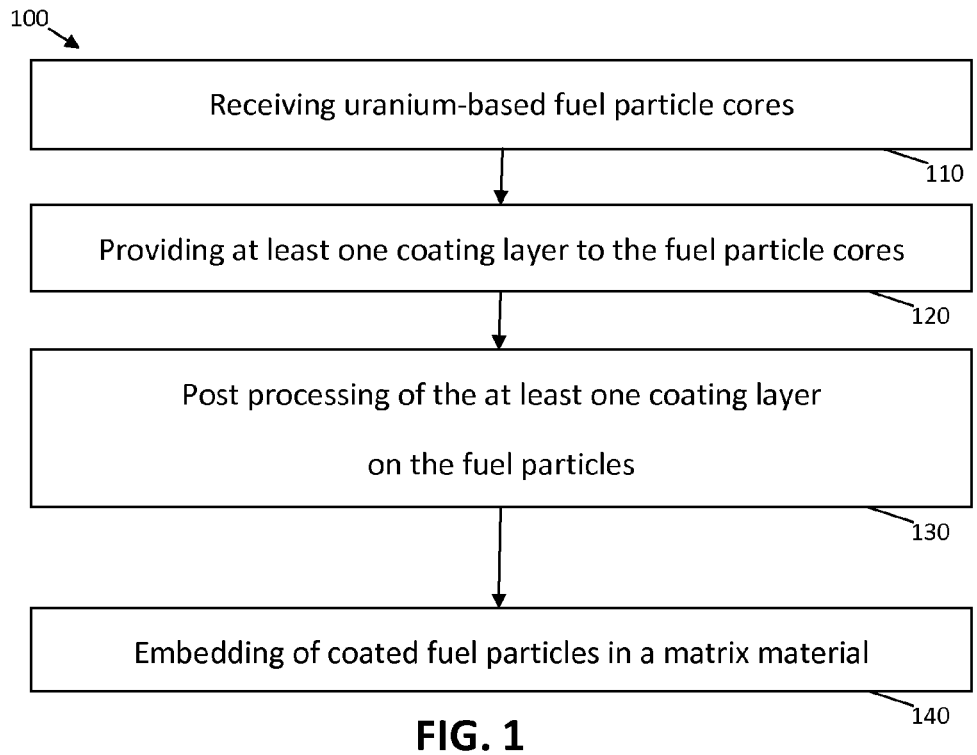
FIG. 1 illustrates a flow chart of an exemplary method for manufacturing coated fuel particles according to an embodiment of the present invention.

Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Where in embodiments of the present invention the term intermetallic is used, reference is made to a material comprising two or more metallic components bound to each other.

Where in embodiments according to the present invention reference is made to "embedded in" reference is made to material lying in surrounding matter. Such embedding may e.g. be a providing a powder dispersion. A first material being embedded in a second material nevertheless does not only refer to a dispersion or mixture, but e.g. also to a compacted mixture, an extruded product of a mixture, etc.

In a first aspect, the present invention relates to a method for producing or processing nuclear fuel products. The nuclear fuel products according to embodiments of the present invention comprise "metallic or intermetallic uranium"-based particles. The nuclear fuel products according to embodiments of the present invention are embedded in a matrix material thereby forming a powder mixture of fuel particles and matrix material. Embedding may e.g. comprise creating a powder dispersion, although embedding is not limited thereto. The method according to embodiments of the present invention comprises receiving metallic or intermetallic uranium-based fuel particle cores, providing, using physical vapour deposition, a coating surrounding the fuel particle core and embedding the particles in a matrix for forming a mixture of coated fuel particles and solid matrix material. The coating applied with physical vapour deposition may provide a predetermined functionality to the fuel particle, such as for example providing a neutron poisoning effect homogeneously spread in the fuel to lower a high reactivity of initial fresh fuel loads, or for example providing an inhibition effect for interaction or interdiffusion between metallic or intermetallic uranium-based particles and a matrix in which they are used, e.g. interaction between U(Mo) and an Al matrix. Using physical vapour deposition allows efficient and good deposition of coating layers, with appropriate flexibility. Further features and advantages will now be illustrated by way of an exemplary method according to an embodiment of the present invention for which a flow diagram is illustrated in FIG. 1, embodiments of the present invention not being limited by this exemplary method.

In a first step, the method comprises receiving metallic or intermetallic uranium-based fuel particle cores. Such receiving may encompass obtaining the metallic or intermetallic uranium-based fuel particle cores e.g. commercially by buying it from the shelve. Commercially available particles are for example U(Mo) particles as available from the Korean Atomic Energy Research Institute (KAERI). Alternatively, the metallic or intermetallic uranium-based fuel particle cores also may be obtained by manufacturing such particles. One example thereof, the present invention not being limited thereto, is production of metallic or intermetallic uranium-based fuel particle cores using a rotating-disk centrifugal atomization process. Metallic or intermetallic uranium particles and alloying metals can for example be melted in a crucible and fed on a rotating disk. On the rotating disk, fine droplets of the melted substance can cool rapidly, e.g. in an inert atmosphere, resulting in substantially spherical particles. An example of such a production method is also described in U.S. Pat. No. 5,978,432, embodiments of the present invention not being limited to this production method for uranium-based cores. One alternative production method is for example based on grinding of the fuel ingots, thus producing ground fuel as opposed to atomised. The diameter of the metallic or intermetallic uranium-based particles is not limiting for the present invention. Typical particle core diameters that e.g. can be used are in the range 50 μm to 100 μm, although the invention is not limited thereto and larger particles also may be used if these become available. Larger particles have the advantage that the surface to volume ratio decreases, resulting in more efficient particles. The metallic or intermetallic uranium-based particles may be uranium alloys, which may for example be gamma-stabilised uranium whereby the alloys are used for stabilising the gamma phase of the uranium. Stabilisation thereby is performed against swelling under irradiation. The metallic or intermetallic uranium based particles may be atomised particles as well as ground particles. Explicit examples of particles that can be used are one or a combination of uranium alloys (eg. pure U, U(Mo), U(Ti), U(Zr), U(Nb)), uranium silicides (eg. $U_3Si_2$, $U_3Si$) or aluminides (eg. $UAl_{3-x}$). One particular example, used as lower enrichment fuel, is U(Mo) alloy wherein Mo is added to metallic uranium to extend the stability domain of the high temperature gamma phase and whereby 7 to 10 wt % is typically considered sufficient to avoid transformation to the alpha phase during the production process.

In a second step, the method comprises providing at least one coating layer to the metallic or intermetallic uranium-based fuel particle using a physical vapour deposition technique. Physical vapour deposition relates to deposition techniques performed in vacuum whereby condensation of a vaporized form of material. In one advantageous embodiment, the physical vapour deposition technique used is sputtering. Embodiments of the present invention nevertheless are not limited thereto and alternative physical vapour deposition techniques also may be applied, such as for example evaporative deposition, e-beam deposition, cathodic arc deposition, pulsed laser deposition, thermal evaporation, etc. Typical deposition conditions that could be used—although the invention is not limited thereto—may comprise a basic pressure of an the order of $10^{-6}$ mbar and the system being backfilled with high purity argon to a pressure of $10^{-3}$ to $10^{-2}$ mbar at room temperature. It is an advantage of some embodiments according to the present invention that deposition can be performed in a controlled manner at a temperature below 500° C., advantageously at a temperature below 300° C., more advantageously substantially at room temperature. The latter avoids oxidation or other reactions of the fuel particles during the coating deposition and transformation of the particles from their gamma phase to the alpha phase. It is an advantage of some embodiments according to the present invention that deposition can be performed without exposure of the particles to hydrogen or gases that liberate hydrogen (eg. silane).

In one embodiment, the method may comprise sputtering a coating on the nuclear fuel particle cores. In one example, sputtering may be performed by providing an amount of nuclear fuel particle cores in a system comprising a system for agitation, e.g. constant agitation, of the nuclear fuel particle cores, such as through a rotating drum or vibration, and coating the particles substantially uniform over their surface by rotating or vibrating the particles such that different portions of their surface are subject to the sputter coating source. More generally, embodiments of the present invention benefit from systems wherein the fuel particles are moved during the physical vapour deposition step, so that different portions of their surface are subject to the sputter coating source. Such techniques allow to obtain a layer surrounding the coating with a substantially fixed thickness. Techniques employing movement of the particles for reaching a substantially homogeneous coating for volumetric items, such as fuel particles, are known to the person skilled in the art.

One or more coating layers may be applied, for example to achieve a double functionality or to achieve an improved functionality by combining different materials.

In some embodiments, the coating consists of a single layer comprising a single element of interest to invoke an effect on the particles or on their use. In a first exemplary embodiment, the coating layer comprises an inhibitor for inhibiting, stabilizing and/or reducing the formation of an interaction layer or for improving the properties of the interaction layer. Inhibitors that may be used for this are those materials having an inhibiting stabilizing and/or reducing effect on the formation of an interaction layer between the metallic or intermetallic uranium-based fuel core and a matrix wherein the particles will be embedded. The inhibition problem has for example been discussed in more detail by Park et al. in Journal of Nuclear Materials 374 (2008) 422-430. The inhibitor may be a barrier and/or stabilizing element. A typical example wherein such inhibitors may play an important role is for U(Mo) particles in an aluminum matrix, although embodiments of the invention are not limited thereto. The inhibitors used may be metals, but can also be used in their oxide, nitride or carbide form. Some examples of inhibitors that may be used are Si, Zr, Nb, U, Mo, Ti, etc. The thickness of the layer to be applied will depend on the amount of the inhibitor required to stabilise or prevent any interaction between the metallic or intermetallic uranium-based fuel core and the matrix and can be tuned or optimized accordingly. If for example in the case of U(Mo) in an aluminum matrix, silicon is used as an inhibitor, the thickness of the layer advantageously may be in the range 100 nm to 2 µm, e.g. between 300 nm and 1 µm. In one particular example, the thickness may be about 600 nm. In another example, in the case of U(Mo) in an aluminum matrix, zirconium nitride is used as an inhibitor, the thickness of the layer advantageously may be in the range 100 nm to 2 µm, e.g. between 300 nm and 1 µm. In one particular example, the thickness may be about 1000 nm. More generally, the thickness of layers comprising inhibitors may be in the range 5 nm to 5 µm, more preferably in the range 10 nm to 2 µm, e.g. 100 nm to 2 µm. Although the required concentration of inhibitors depends on the inhibitor and the way it influences both the mechanism of interaction layer formation and the properties of the interaction layer, the required inhibitor concentration, when e.g. Si is used, may in one example be set between 1 vol % and 10 vol % of the matrix volume. The lower limit may be determined by the concentration whereby the interaction layer shows a stable behaviour under irradiation and whereby the growth of the interaction layer , thanks to this inhibitor content, does not exceed the volume where the inhibitor concentration would fall below that lower limit during the life of the fuel. The upper limit may be selected so that it does not exceed e.g. 10 vol % of the matrix, because the inhibitor influence on the fuel element itself should be kept to a minimum. It is an advantage of embodiments according to the present invention that the inhibitors are added so they can be used in an efficient way, allowing minimization of the added inhibitor concentration, while still obtaining the required functionality. It is an advantage of coating of the fuel particle cores, that the inhibitors are appropriately homogeneously distributed around the cores, such that optimum inhibition, stabilization and/or reduction can take place. The presence of the coating layer in a reactor can provide a sufficient influx of inhibitor material into the interaction layer between the metallic or intermetallic uranium based fuel particle core and the matrix to stabilize the behaviour of the interaction layer and its rate of formation. In some embodiments, the presence of the coating layer in a reactor can also provide a barrier for the direct interaction between the uranium in the fuel particle and the matrix material by inhibiting all contact between these two materials, even as these materials diffuse under the influence of temperature, ion bombardment by the fission products of the uranium, or other causes for diffusion.

Figure 2:
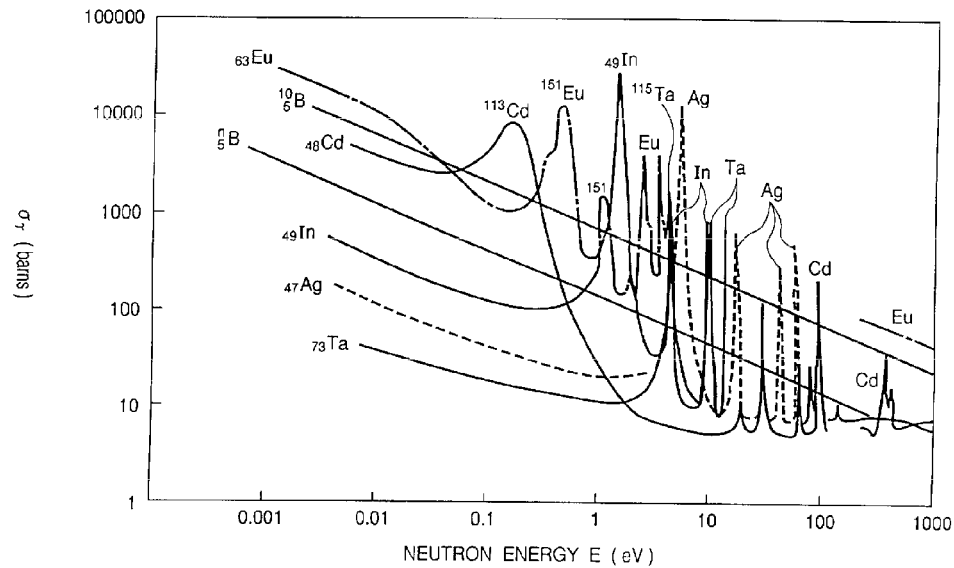
FIG. 2 illustrates the neutron poison cross section of a number of materials, that may be used in embodiments according to the present invention.

In a second exemplary embodiment, the coating comprises neutron poisons. Neutron poisons advantageously are materials with large neutron absorption cross-section. They provide the functionality of reducing high reactivity to initial fresh fuel load and advantageously, by depletion when they absorb neutrons during reactor operation, lose functionality so that the overall reactivity of the reactor is more constant. Examples of neutron poisons that may be used are B, Sm, Gd, Dy, Ag, In, Cd, Er, Hf, Eu, Ta, etc. The required layer thickness for obtaining the appropriate neutron poison effect depends on the particle size and the neutron poison cross section, as well as on the requirements of the reactor. By way of illustration, the neutron poison cross section for different materials as function of the neutron energy is shown in FIG. 2. In one example, the thickness of the layer may be selected such that a quantity between 0.1 and 2 weight percent with respect to the total uranium-235 mass is present. Some examples of neutron poison coating layers then may have a resulting thickness in the range 100 nm to 200 nm. Nevertheless, the required neutron poison effect may be different for different fuel particle cores, and the thickness of the neutron poison coating layer may be adapted to tune to the required neutron poison effect. The latter can be e.g. performed by test depositions for the fuel particle core envisaged.

In a second set of embodiments, the coating may comprise more than one element of interest, either to invoke an improved effect on the particles or on their use. In one particular embodiment, a single layer comprising different materials invoking different effects may be deposited around the fuel particle core. For example a combination of an inhibition element and a neutron poisoning element may be provided in a single layer. It thereby is an advantage of physical vapour deposition processes that these are flexible in allowing co-deposition, i.e. they can be easily configured for co-deposition of the different materials e.g. by using multiple deposition sources, by using a source material comprising different materials, etc. In the particular example of a coating combining inhibitors with neutron poison material a combination of materials as described above can be used, whereby the neutron poison material may be introduced in the layer as dopant, substantially not altering the properties of the inhibitor coating layer.

In another particular embodiment, a stack of coating layers may be provided, whereby different layers provide different functionality to the coating and the corresponding coated fuel articles. In some examples, a stack of an inhibitor coating layer and a coating layer comprising neutron poisons is used to invoke both inhibition and neutron poisoning effects. The overall thickness of the stack advantageously may be in the range 50 nm to 5 µm, more preferably in the range 100 nm to 2 µm. In one example, the neutron poison materials also may have interaction inhibition functionality. The latter may result in a reduction of the thickness of the inhibitor coating layer.

In an optional third step, post processing of the coating may be performed. One example of a post processing step that may be applied is annealing. Annealing may be performed at temperatures between 400° C. and 1100° C., e.g. between 500° C. and 1000° C. It may be performed at normal pressure in an inert atmosphere, e.g. in an argon or helium gaseous environment. The annealing time may be in the range of a couple of seconds to one or more hours, e.g. in the range 1 minute to 1 hour. Such annealing may result in the formation of compounds between uranium and the coating. Another post processing step, which may inherently be performed during use of the fuel articles, may be irradiation. The latter may result in formation of compounds between uranium and the coating and may be less subject to oxidation, phase transformation and alteration of the microstructure of the fuel particle core.

In another step, the method furthermore comprises embedding the particles in a matrix thereby forming a powder mixture of fuel particles and matrix material. Embedding thereby may be creating that fuel particles are lying in surrounding matrix material. In some embodiments a powder dispersion of the fuel particles and the solid matrix powder material is created by the embedding. The mixing advantageously may be done using particles with a diameter within a certain selected range, in order to obtain a homogeneous dispersion of the particles in the matrix material. If the particles do not yet have a diameter within this range, the latter can for example be obtained by performing granulometric selection. Particles with appropriate size may then be mixed by mixing the particles and the matrix material.

In one embodiment, embedding the fuel particles in a matrix material may be obtained by providing the two components in a recipient and mixing the components. Such mixing may be performed by manually or mechanically mixing, such as steering, shaking, magnetically steering, . . . , techniques that are well known to the person skilled in the art.

The mixed material may be used for producing a fuel element. The method therefore also may comprise compacting the material, e.g. by pressing the material into a compact and eventually processing the compact into a fuel element, e.g. in the shape of a rod or a plate. In one embodiment, compacting the material may be obtained by pressing. Different types of pressing setups are available on the market, the compacting not particularly being limited by the pressing technique. Processing into a fuel element may comprise, in one embodiment, hot rolling technique, e.g. of the powder mixture in between two plates. Hot rolling techniques applied may correspond with the techniques available in the field.

E.g. in some embodiments a plate like material may be obtained by laminating the pressed mixture between two plates of aluminium and optionally also providing aluminium portions at the edges surrounding the mixture and then hot rolling of the material to get a thin plate. Alternatively also rods or other shaped elements can be formed. In one particular example, the pressed compact of the powder mixture of coated fuel particles and matrix material is placed in an Al alloy picture frame between two Al alloy plates, after which the sandwich structure is rolled to the required thickness for forming a fuel element.

The matrix wherein the coated fuel particles are embedded may be e.g. an aluminium, silicon, magnesium, zirconium or molybdenum matrix, or a matrix being made of a mixture/alloy of these elements. The matrix may be pure, but can also be the above identified materials mixed with other materials, such as inhibitors or neutron poisons.

In some embodiments, the method comprises an additional step of providing an intermediate coating for improving the adhesion of one coating layer on the fuel particle core or on another coating layer. In one example, Ti or Zr interlayers may be provided for improving adhesion of one layer on the core or on another layer. The interlayer may have a thickness of a few nanometre. An outer coating corresponding to the matrix material in which the particles are to be embedded can also be applied to improve the adhesion of the coated fuel particles to the matrix. In one example a Ti or Zr interlayer is used between the U(Mo) fuel particle core and the Si overlayer resulting in an improved adhesion of the Si overlayer on the fuel particle core. In another example an outer Al coating is applied to the coated U(Mo) fuel particle resulting in an improved adhesion of the coated fuel particle to the Al matrix in which the particle is embedded. Production of such outer- or interlayers may be easy due to the flexibility of the production technique.

In a second aspect, the present invention relates to a nuclear fuel product comprising a matrix and nuclear fuel particles for use in nuclear reactors. According to embodiments of the present invention, the nuclear fuel product comprises a powder mixture of matrix material and nuclear fuel particles based on fuel particles being embedded in the matrix material, the nuclear fuel particles comprising a metallic or intermetallic uranium-based fuel particle core and at least one physical vapour deposited coating layer, surrounding the fuel particle core. A matrix material and nuclear fuel particles embedded therein may comprise a powder dispersion, e.g. homogeneous powder dispersion, of the coated fuel particles in a solid matrix powder. The coated particles advantageously may be made according to an embodiment of the first aspect of the present invention, although embodiments of the second aspect are not limited thereto. The metallic or intermetallic uranium- based particles may be uranium alloys, which may for example be gamma-stabilised uranium whereby the alloying elements are used for stabilising the gamma phase of the uranium. Stabilisation thereby is performed against swelling under irradiation. The metallic or intermetallic uranium based particles may be atomised particles as well as ground particles. Explicit examples of particles that can be used are one or a combination of uranium alloys (pure U, U(Mo), U(Ti), U(Zr), U(Nb)), uranium silicides (eg. $U_3Si_2$ $U_3Si$) or aluminides (eg. $UAl_{3-x}$). The diameter of the metallic or intermetallic uranium-based particles is not limiting for the present invention. Typical particle core diameters that e.g. can be used are in the range 50 µm to 100 µm, although the invention is not limited thereto and larger particles also may be used if these become available. Larger particles have the advantage that the surface to volume ratio decreases, resulting in more efficient particles.

The matrix material wherein the coated fuel particles are embedded may be e.g. an aluminium, silicon, magnesium, zirconium or molybdenum matrix, or a matrix being made of a mixture/alloy of these elements. The matrix may be pure, but can also be the above identified materials mixed with other materials, such as inhibitors or neutron poisons.

The at least one coating layer is deposited with a physical vapour deposition technique, such as for example sputtering, e-beam evaporation, thermal evaporation, cathodic arc deposition, pulsed laser deposition, thermal evaporation, etc. The physical vapour deposited coating layer may be made by physical vapour deposition at low temperature, e.g. below 500° C., e.g. below 300° C., e.g. substantially at room temperature, thus in some embodiments resulting in a physical vapour deposited coating layer that is substantially amorphous as could be established using XRD. In some embodiments, e.g. when using ZrN, the coatings deposited using physical vapour deposition may be nanocrystalline. Embodiments of the present invention may comprise a single coating layer or a multiple of coating layers, providing one or optionally more functionalities to the particles or their use. The at least one coating layer may comprise an inhibitor for inhibiting, stabilizing and/or reducing the formation of an interaction layer or for improving the properties of the interaction layer. Inhibitors and layers comprising such inhibitors may be as described in embodiments of the first aspect. The at least one coating layer may in addition or alternative to inhibitors comprise neutron poisons. Neutron poisons advantageously are materials with large neutron absorption cross-section. They provide the functionality of reducing high reactivity to initial fresh fuel load and advantageously, by depletion when they absorb neutrons during reactor operation, lose functionality so that the overall reactivity of the reactor is more constant than without neutron poisons. Neutron poisons and the layers comprising them may be as described in embodiments of the first aspect. Different materials with different functionality may be co-deposited resulting in a mixed single coating layer, or they may be deposited as a stack of layers.

The fuel particles may be annealed, using a process as described in the first aspect. Other features and advantages also may be as those described or stemming from manufacturing method embodiments of the first aspect.

In some embodiments, an intermediate layer for improving the adhesion may be provided between the core and the coating layers, e.g. inhibitor or neutron poison layer(s), or in between different layers of a coating stack, or between the matrix and the surface of the outer coating layer. In one example, Ti or Zr interlayers may be provided for improving adhesion of one layer on the core or on another layer. The interlayer may have a thickness of a few nanometer. In one example a Ti or Zr interlayer is used between the U(Mo) fuel particle core and the Si overlayer resulting in an improved adhesion of the Si overlayer on the fuel particle core. In another example, an outer Al coating layer may be applied to improve the compatibility and adhesion of the coated particles and the Al matrix in which they are embedded.

In a third aspect, a nuclear fuel product for use in nuclear reactors or nuclear reactor fuel is described wherein the nuclear fuel product comprises a powder mixture of matrix material and nuclear fuel particles, based on fuel particles being embedded in the matrix material, the nuclear fuel particles comprising a metallic or intermetallic uranium-based fuel particle core and at least one coating layer comprising neutron poisons. A matrix material and nuclear fuel particles embedded therein may comprise a powder dispersion, e.g. homogeneous powder dispersion, of the coated fuel particles in a solid matrix powder. The latter results in the advantage of having a homogeneous distribution of neutron poisons inside the fuel element, resulting in a more efficient neutron poisoning effect. The coated particles advantageously may be made according to an embodiment of the first aspect of the present invention, although embodiments of the third aspect are not limited thereto. Other features and advantages also may be as those described or stemming from manufacturing method embodiments of the first aspect.

In a fourth aspect, a nuclear fuel product for use in nuclear reactors or nuclear reactor fuel is described wherein the nuclear fuel product comprises a powder mixture of matrix material and nuclear fuel particles, based on fuel particles being embedded in the matrix material, the nuclear fuel particles comprising a metallic or intermetallic uranium-based fuel particle core and at least one coating layer comprising inhibitor elements. A matrix material and nuclear fuel particles embedded therein may comprise a powder dispersion, e.g. homogeneous powder dispersion, of the coated fuel particles in a solid matrix powder. The latter results in the advantage of having a homogeneous distribution of inhibitor elements inside the fuel element and accurately surrounding the core fuel particle material and accurately chemically isolting it from the matrix material. The inhibitor elements may comprise one of or a combination of Si, Zr, Nb, U, Mo, Al, Ti, As, Mg, Ge, Sn, Pb, Bi, Se, Sb or Te. The inhibitor may comprise any or a combination of Group IIIa, Iva, Va and VIa elements, on rows 3, 4, 5 and 6 of the table of elements, excluding Po, P and S. The inhibitor elements may be provided as an oxide, nitride or carbide of such inhibitor elements.

In some embodiments, the inhibitor element may comprise Zr or an oxide, nitride or carbide thereof. In some embodiments, the inhibitor element may be ZrN. In some embodiments, they may be provided through direct deposition of the oxide, nitride or carbide or through reactive deposition of the elements. In some embodiments, inhibitor elements, e.g. including other inhibitor elements than cited above, either in their elemental state or as an oxide, nitride or carbide may be used, the inhibitor elements being adapted for providing a barrier between the atoms of the metallic or intermetallic uranium based fuel and the atoms of the matrix material as these become mobile, either due to temperature, ionic bombardment by fission products of the uranium or another source of mobility. For this purpose, heavier and/or denser compounds are advantageous. Inhibitor elements are selected such that they do not interact with the particle fuel core and the matrix. The coated particles advantageously may be made according to an embodiment of the first aspect of the present invention, although embodiments of the fourth aspect are not limited thereto. Other features and advantages also may be as those described or stemming from manufacturing method embodiments of the first aspect.

In a fifth aspect, the present invention relates to a fuel element for generating neutrons, wherein the fuel element comprises a powder mixture of a plurality of nuclear fuel particles in matrix material, based on the fuel particles being embedded in a matrix material as described in embodiments of the second, third or fourth aspect. A matrix material and nuclear fuel particles embedded therein may comprise a powder dispersion, e.g. homogeneous powder dispersion, of the coated fuel particles in a solid matrix powder. Furthermore, a nuclear installation comprising such a fuel element also is envisaged. Such nuclear installations could include test reactors, propulsion reactors, etc. Such a fuel element may be a plate, rod, tube. The fuel elements may be made using extrusion or coextrusion techniques using the powder mixture of matrix material and fuel particles or may be obtained through rolling of compacted powder mixture of matrix material and fuel particles, e.g. using a lamination between plates.

In a sixth aspect, the present invention also relates to a method for producing or processing nuclear fuel products comprising a matrix and fuel particles embedded therein. The nuclear fuel particles according to embodiments of the present invention are "metallic or intermetallic uranium"-based particles, although embodiments of the invention are not limited thereto. The method according to embodiments of the present invention comprises receiving metallic or intermetallic uranium-based fuel particle cores, providing a coating surrounding the fuel particle core wherein the coating comprises neutron poisons and embedding the particles in a matrix so as to obtain a powder mixture of fuel particles and matrix material. Embedding nuclear fuel particles in a matrix material may comprise providing a powder dispersion, e.g. homogeneous powder dispersion, of the coated fuel particles in a solid matrix powder. It is an advantage of embodiments according to the present aspect that a homogeneous distribution of neutron poisons is provided and that an efficient effect of neutron poisoning can be obtained in a nuclear reactor. The methods used for depositing the at least one coating are not necessarily restricted to physical vapour deposition methods, but deposition also could be performed using other methods such as for example chemical vapour deposition or fluidised bed chemical vapour deposition. Use of physical vapour deposition may be advantageous as it, amongst others, allows deposition at low temperature, provides flexibility. Further features and advantages of embodiments according to the fifth aspect may be as set out in embodiments of the first aspect.

In a seventh aspect, the present invention also relates to a method for producing or processing nuclear fuel products comprising a matrix and fuel particles embedded therein. The nuclear fuel particles according to embodiments of the present invention are "metallic or intermetallic uranium"-based particles, although embodiments of the invention are not limited thereto. The method according to embodiments of the present invention comprises receiving metallic or intermetallic uranium-based fuel particle cores, providing a coating surrounding the fuel particle core wherein the coating comprises inhibitor elements and embedding the particles in a matrix so as to obtain a powder mixture of fuel particles and matrix material. Embedding nuclear fuel particles in a matrix material may comprise providing a powder dispersion, e.g. homogeneous powder dispersion, of the coated fuel particles in a solid matrix powder. It is an advantage of embodiments according to the present aspect that a homogeneous distribution of inhibitor elements inside the fuel element and accurately surrounding the core fuel particle material and accurately chemically isolting it from the matrix material. The methods used for depositing the at least one coating are not necessarily restricted to physical vapour deposition methods, but deposition also could be performed using other methods such as for example chemical vapour deposition or fluidised bed chemical vapour deposition. Use of physical vapour deposition may be advantageous as it, amongst others, allows deposition at low temperature, provides flexibility. Further features and advantages of embodiments according to the fifth aspect may be as set out in embodiments of the first aspect.

Other variations to the disclosed embodiments can be understood and effected by those skilled in the art in practicing the claimed invention, from a study of the drawings, the disclosure and the appended claims. For example, the present invention also relates to the use of the products as fuel assembly or fuel element or for producing such fuel assemblies or fuel elements. The present invention also relates to the use of products in a nuclear installation.

That invention claimed is:

1. A method for producing nuclear fuel products, the method comprising:
   receiving metallic or intermetallic uranium-based fuel particle cores,
   providing at least one physical vapour deposited coating layer surrounding the fuel particle core, the physical vapour deposited coating layer having a layer thickness between 5 nm and 2 μm, and
   embedding the coated fuel particles in a matrix material so as to form a powder mixture of coated fuel particles and matrix material.

2. The method according to claim 1, wherein embedding the coated fuel particles in a matrix material comprises obtaining a powder dispersion of the fuel particles and the solid matrix powder material.

3. The method according to claim 1, wherein the method furthermore comprises compacting the powder mixture of coated fuel particles and matrix material by pressing.

4. The method according to claim 1, wherein providing at least one physical vapour deposited coating layer comprises sputtering a coating layer having a thickness between 100 nm and 2 μm on the fuel particle core.

5. The method according to claim 1, wherein the method furthermore comprises annealing the provided coating layer.

6. The method according to claim 1, wherein providing at least one physical vapour deposited coating layer comprises providing at least one physical vapour deposited coating layer comprising inhibitor elements for inhibiting formation of an interaction layer between the coated fuel particles and the matrix material.

7. The method according to claim 6, wherein the coating layer comprises ZrN or Si to avoid interaction between the coated fuel particles and the matrix material.

8. The method according to claim 1, wherein providing at least one physical vapour deposited coating layer comprises providing at least one physical vapour deposited coating layer comprising neutron poisons.

9. The method according to claim 8, wherein the at least one physical vapour deposited coating layer comprising neutron poisons has a layer thickness between 100 nm and 200 nm.

10. The method according to claim 1, wherein providing the at least one physical vapour deposited coating layer comprises one or more of providing a single coating layer comprising both neutron poisons and inhibitor elements using co-deposition and providing a plurality of coating layers, each layer comprising one or more elements for introducing an additional functionality to the fuel particles.

11. The method according to claim 1, wherein the providing at least one physical vapour deposited coating layer is performed at room temperature.

12. A nuclear fuel product comprising a matrix material and nuclear fuel particles embedded therein, said fuel product based on a powder mixture of the matrix material and the nuclear fuel particles, the nuclear fuel particles comprising a metallic or intermetallic uranium-based fuel particle core and at least one physical vapour deposited coating layer surrounding the fuel particle core, the at least one physical vapour deposited coating layer having a thickness between 5 nm and 2 µm.

13. The nuclear fuel product according to claim 12, wherein the powder mixture is a powder dispersion of the fuel particles and the solid matrix powder material, and/or wherein the powder mixture of matrix material and coated fuel particles are compacted.

14. The nuclear fuel product according to claim 12, wherein the physical vapour deposited coating layer has a thickness between 100 nm and 2 µm and/or wherein the at least one physical vapour deposited coating is an amorphous coating layer and/or wherein the at least one physical vapour deposited coating layer is annealed.

15. The nuclear fuel product according to claim 12, wherein the at least one physical vapour deposited coating layer comprises inhibitor elements for inhibiting formation of an interaction layer of the nuclear fuel particle with the matrix material and/or inhibiting the negative effects of this interaction layer formation on the behaviour of the fuel during its use.

16. The nuclear fuel product according to claim 15, wherein the inhibitor elements comprise one of or a combination of Si, Zr, Nb, U, Mo, Al, Ti, As, Mg, Ge, Sn, Pb, Bi, Se, Sb or Te, an oxide thereof, a nitride thereof or a carbide thereof.

17. The nuclear fuel product according to claim 12, wherein the at least one physical vapour deposited coating layer comprises neutron poisons.

18. The nuclear fuel product according to claim 17, wherein the neutron poisons comprise one of or a combination of B, Sm, Gd, Dy, Ag, In, Cd, Er, Hf, Eu or Ta.

19. The nuclear fuel product according to claim 12, wherein the at least one physical vapour deposited coating layer comprises a single coating layer comprising both neutron poisons and inhibitor elements obtained by co-deposition and/or wherein the at least one physical vapour deposited coating layer comprises a stack of at least two layers, one layer comprising neutron poisons, another layer comprising inhibitor elements.

20. The nuclear fuel product according to claim 12, wherein the metallic or intermetallic uranium-based core comprise one or a combination of uranium alloys, uranium silicides or aluminides.

21. The nuclear fuel product according to claim 12, the nuclear fuel product being in the shape of a fuel plate or fuel rod.

22. A nuclear installation for generating neutrons, the nuclear installation comprising a fuel element that is a nuclear fuel product as recited in claim 12.

* * * * *